Patented Sept. 26, 1950

2,523,282

UNITED STATES PATENT OFFICE 2,523,282

COMPOSITIONS COMPRISING ACRYLONITRILE HOMOPOLYMERS

Masten Rufus Dalton, New Castle, Del., assignor to American Viscose Corporation, Wilmington, Del., a corporation of Delaware No Drawing. Application August 25, 1947, Serial No. 770,556

2 Claims. (Cl. 260—32.4)

This invention relates to new compositions comprising solutions of acrylonitrile homopolymers, and to a method of preparing such solutions.

It has long been recognized that polymerized acrylonitrile possesses the important properties of high softening point and resistance to common organic solvents, the latter property being so marked as to have prevented use of the homopolymers for various purposes due to the difficulty experienced in getting them into solution. The resistance of the polymers to the organic solvents generally available is recognized as due to the presence within the polymer molecules of strong hydrogen-bonding forces, and the inability of most organic solvents to undergo hydrogen bonding with the active hydrogen-bonding groups of the polymer molecules. Apparently, this strong hydrogen bond which is characteristic of polymerized acrylonitrile is weakened or modified when acrylonitrile is copolymerized or interpolymerized with other polymerizable substances, since the copolymers are more easily dissolved in available solvents, particularly if the amount of acrylonitrile combined in the polymer molecule is not greater than about 85% by weight. It is well recognized that the presence of units of another substance in an acrylonitrile polymer markedly affects the solubility of the polymers, the copolymers being soluble to a greater or lesser extent in the more common organic solvents, depending upon the particular substance which is polymerized with the acrylonitrile, and the amount thereof present in polymer molecule. The effect of the presence of the substance other than acrylonitrile in the polymer molecule in increasing the solubility of the copolymer as compared with acrylontrile homopolymers is such that if a material is found to effect dissolution of polyacrylonitrile per se, it is safe to assume that the same material will effect dissolution of the copolymers as well. However, the fact that a material or mixture of materials effects dissolution of the copolymers, does not indicate that the same material or mixture will effect dissolution of polyacrylonitrile. The forces which are present in the homopolymers, and which render the latter strongly resistant to solvation, are modified in the copolymers, so that while a substance may effect dissolution of a copolymer of, say, acrylonitrile and vinyl acetate, it does not necessarily follow that the same substance will effect dissolution of the homopolymers.

Recently, it has been proposed in United States Patents Nos. 2,404,714 and 2,404,727 to dissolve polyacrylonitrile in certain organic substances containing so-called "solvogenic" groups and including dimethyl formamide, dimethyl methoxy acetamide hexamethylene imine, butadiene cyclic sulphone, tetramethylene cyclic sulphone, p-phenylene diamine, and the m- and p-nitrophenols. Although these substances contain groups capable of undergoing hydrogen-bonding with the active hydrogen-bonding groups of the polyacrylonitrile molecules, thus weakening the strong hydrogen bond within the polymer molecule and causing the hydrogen-bonding forces to be shared between molecules of the polymer and the organic substance, and are therefore solvents for polyacrylonitrile, they possess the outstanding disadvantage that, due to the strong swelling effect which they exert on polyacrylonitrile at ordinary temperatures, the solutions must be prepared under special conditions. Moreover, complete dissolution of the homopolymer is effected only at elevated temperatures. Under normal conditions, polyacrylonitrile cannot be dispersed in dimethyl formamide or the other solvents mentioned herein at room temperature. If polyacrylonitrile is introduced into, say, dimethyl formamide at room or ordinary temperature, in the usual particulate form, the particles immediately swell and ball up or coalesce, forming lumps which cannot be broken readily and are not entirely disintegrated even after vigorous stirring at high temperatures. Compositions obtained by mixing polyacrylonitrile and the solvent at room temperature, and then stirring the mixture for prolonged periods, whether at temperatures at 100° C. or less, or at excessively high temperatures of around 150° C., are highly colored, usually from a golden to dark brown color.

Two methods have been proposed for meeting the difficulties which arise from the fact that the organic substances previously proposed as solvents for the acrylonitrile polymers are swelling agents for the polymers at ordinary temperatures. One such method involves effecting dispersion of the polymers in the solvent in the presence of gaseous acidic anhydrides, and then heating the dispersion to a temperature of 150° C. Obviously, that method is comparatively expensive and ill-adapted to preparation of the solutions on a commercial scale. The other method already proposed for preparing solutions of the polymers in the mentioned solvents entails the steps of pre-cooling the solvent to 0° C., introducing the particulate acrylonitrile polymer into the cooled solvent to produce a slurry, permitting the slurry to set to a dough-like mass, raising the temperature of the mass to 150° C. and maintaining the mass at that temperature until dissolution of the polymer is complete. That method has the drawbacks that both the temperature to which the solvent is brought prior to introduction of the polymer, the temperature to which the slurry or dough-like mass is brought, and the period of exposure of the mass to the increased temperature are critical to the production of colorless and homogeneous solutions of the polymers. If the mass is raised to a temperature below 150° C., complete dissolution of the polymer is not effected, while if the temperature exceeds 150° C., or the mass is exposed to a temperature of 150° C. for a time exceeding a critical limit, the polymer is dissolved but the resulting solution is highly colored and not suitable for use.

The primary object of this invention is to provide a solvent for polyacrylonitrile which is not a swelling agent for the polymers at room or ordinary temperature. Another object is to provide solvents which may be used to produce colorless or substantially colorless and homogeneous solutions of polyacrylonitrile under the most commercially practicable and economical conditions.

I have found that binary mixtures consisting of nitromethane and α-hydroxy propionitrile, in which the nitromethane is present in an amount of from about 60 to 80 volume per cent, based on the total volume of the binary mixture, have oustanding advantages in the preparation of solutions of acrylonitrile homopolymers in a wide range of molecular weights which may vary, for example, from 15,000 to 250,000 or higher, as calculated from viscosity measurements by Staudinger's formula. These binary mixtures do not swell the homopolymers at room temperature, and are capable of completely dissolving the homopolymer at temperatures below 100° C., generally at temperatures between 80 and 90° C.

In accordance with this invention, then, solutions of the acrylonitrile homopolymers are obtained by dispersing the homopolymers in the binary mixture at room temperature, stirring the dispersion and raising the temperature thereof to between 80 and 90° C., and continuing the stirring at the elevated temperature until dissolution of the homopolymer is complete, usually three hours. Very clear, colorless, and homogeneous solutions are obtained in this manner. They may be used as lacquers and coating compositions, in the production of sheets, films, rods, tubings, shipping or storage containers for various materials, or in the production of articles of other shapes such as fibers.

The following example in which parts, proportions, and percentages are by weight unless otherwise specified is illustrative of the invention.

Example 92 parts of polyacrylonitrile having a molecular weight in excess of 100,000 and in the form of particles of 20 mesh, were dispersed in a binary mixture consisting of 70 volume per cent nitromethane and 30 volume per cent of α-hydroxy propionitrile at room temperature. The dispersion was stirred and brought to a temperature of 80–90° C. After about 2–3 hours, dissolution of the homopolymer was complete.

Since it will be obvious that changes and modifications can be made in the exact details described above without departing from the nature and spirit of the invention, it is to be understood that the invention is not to be limited to such details except as set forth in the appended claims.

I claim:

1. A composition of matter comprising an acrylonitrile homopolymer dissolved in a binary mixture consisting of nitromethane and α-hydroxy propionitrile, the nitromethane being present in the binary mixture in an amount of from 60 to 80 volume per cent based on the total volume of such mixture.

2. A composition of matter comprising an acrylonitrile homopolymer dissolved in a binary mixture consisting of nitromethane and α-hydroxy propionitrile, the nitromethane being present in an amount of 70 volume per cent, based on the total volume of the binary mixture.

MASTEN RUFUS DALTON.

REFERENCES CITED

The following references are of record in the file of this patent:

UNITED STATES PATENTS

| Number | Name | Date |
| --- | --- | --- |
| 2,360,867 | Garvey | Oct. 24, 1944 |
| 2,404,714 | Latham | July 23, 1946 |